: US008499346B2

(12) United States Patent
Kilgore et al.

(10) Patent No.: US 8,499,346 B2
(45) Date of Patent: Jul. 30, 2013

(54) SECURE AUTHENTICATION AT A SELF-SERVICE TERMINAL

(75) Inventors: Andrew D. J. Kilgore, Angus (GB); Ranjith T. Suresh, Dundee (GB); Stefano Cipollone, Milan (IT)

(73) Assignee: NCR Corporation, Duluth, GA (US)

( * ) Notice: Subject to any disclaimer, the term of this patent is extended or adjusted under 35 U.S.C. 154(b) by 488 days.

(21) Appl. No.: 12/641,722

(22) Filed: Dec. 18, 2009

(65) Prior Publication Data

US 2011/0154481 A1 Jun. 23, 2011

(51) Int. Cl.
*G06F 21/00* (2013.01)
(52) U.S. Cl.
USPC ............. 726/19; 726/16; 726/17; 726/18; 726/20; 713/182; 713/183; 713/184; 713/185
(58) Field of Classification Search
USPC .................... 707/10; 726/2, 26, 19; 380/4
See application file for complete search history.

(56) References Cited

U.S. PATENT DOCUMENTS

| 5,917,421 A * | 6/1999 | Saunders ............... 340/5.41 |
| 7,546,300 B2 * | 6/2009 | Chisholm et al. .............. 1/1 |
| 2007/0136573 A1 * | 6/2007 | Steinberg ............... 713/155 |

\* cited by examiner

*Primary Examiner* — Longbit Chai
(74) *Attorney, Agent, or Firm* — Michael Chan

(57) ABSTRACT

A method of providing secure authentication of a service user at a self-service terminal is described. The method comprises: detecting attempted access by the service user to a restricted function on the self-service terminal and ascertaining if a predefined operating system account is present on the terminal. In the event that the predefined operating system account is not present, then the method comprises permitting access to the restricted function by the service user. In the event that the predefined operating system account is present, then the method comprises requesting the service user to provide login credentials and authenticating the login credentials using the operating system account. If the login credentials are not authenticated, access to the restricted function is denied; whereas, if the login credentials are authenticated, access to the restricted function is permitted.

20 Claims, 4 Drawing Sheets

SECURE AUTHENTICATION AT A SELF-SERVICE TERMINAL

FIELD OF INVENTION

The present invention relates to secure authentication at a self-service terminal (SST).

BACKGROUND OF INVENTION

SSTs are public access devices that provide goods and services to customers in an unattended environment and/or in an unassisted manner. One common type of SST is an Automated Teller Machine (ATM). To ensure that ATMs remain operational, ATM vendors typically provide management software for performing settlement, diagnostic and maintenance tasks on the ATM. This software is typically referred to as a supervisor application. To access the supervisor application, a servicing person (not an ATM customer) typically presses a switch that changes the ATM from transaction mode (where a customer can enter a transaction) to supervisor mode (where settlement, diagnostic and maintenance tasks can be performed).

The Payment Card Industry (PCI) has implemented a Payment Application Data Security Standard (PA-DSS) that requires ATMs (i) to restrict access to certain supervisor functions to authorized personnel, and (ii) to maintain an audit of any servicing personnel who access those restricted functions available in supervisor mode. Details of this standard are available at https://www.pcisecuritystandards.org. However, not all ATM owners need to, or desire to, comply with the PA-DSS guidelines.

It would be desirable to be able to use the same supervisor software on ATMs that comply with PA-DSS and on ATMs that do not need to comply with PA-DSS.

This could be achieved using a runtime registry setting in the operating system of the ATM, but this would not be compliant with PCI-DSS guidelines.

SUMMARY OF INVENTION

Accordingly, the invention generally provides methods, systems, apparatus, and software for secure authentication at a self-service terminal.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of providing secure authentication of a service user at a self-service terminal, the method comprising: detecting attempted access by the service user to a restricted function on the self-service terminal; ascertaining if a predefined operating system account is present on the terminal; in the event that a predefined operating system account is not present, permitting access to the restricted function by the service user; in the event that a predefined operating system account is present, requesting the service user to provide login credentials; authenticating the login credentials using the operating system account; in the event that the login credentials are not authenticated, denying access to the restricted function; and in the event that the login credentials are authenticated, providing access to the restricted function and storing details of when the login credentials were authenticated.

As used herein, the term service user refers to a person authorized to conduct maintenance, diagnostic, or settlement operations on an SST. It does not refer to a customer of the SST who performs transactions at the SST. A service user may be a first line maintenance person, a second line maintenance person, a replenishment person, or the like.

Maintenance operations typically include clearing jammed media, for example, printer paper jammed in a receipt printer. Diagnostic operations typically include accessing logs and tallies storing details of the number of operations performed by a module (for example, the number of receipts printed by a thermal receipt printer head). Settlement operations typically include: entering a number of banknotes that have been loaded, accessing a list of deposits executed by the ATM, and such like.

The step of detecting attempted access by the service user to a restricted function on the self-service terminal may be implemented before, during, or after implementing the step of ascertaining if a predefined operating system account is present on the terminal.

The step of detecting attempted access by the service user to a restricted function on the self-service terminal may further comprise detecting attempted access to a TCP/IP configuration menu option, a dialup configuration menu option, a set password menu option, an encryption key entry menu option, a software update menu option, or the like.

The step of ascertaining if a predefined operating system account is present on the terminal may comprise detecting if a named operating system group of user accounts has been defined by the operating system.

The step of requesting the service user to provide login credentials may comprise requesting the service user to enter a username and password combination.

The step of authenticating the login credentials using the operating system account may comprise ascertaining if the entered username is listed in a named operating system group of user accounts, and if the username is listed, ascertaining if the entered password matches the stored password for that operating system account.

The method may comprise the further step of ensuring that the operating system account for a user does not permit the user to login to the terminal as the terminal is booting up. This may be implemented by granting the user batch job privilege only.

It will now be appreciated that this aspect has the advantage of avoiding an application from having to manage encryption keys to protect login credentials because the operating system is used to create a user account with defined privileges and to authenticate any access to that account. This means that the application only has to detect when secure authentication is needed (when an attempt is made to access a restricted function) and then to relay entered information to the operating system for authentication. Thus, the operating system securely stores any encryption keys, user accounts, and passwords that are needed, ensures that these cannot be obviated by altering registry settings, and maintains an audit trail of authenticated login attempts.

According to a second aspect there is provided a self-service terminal providing secure authentication of a service user attempting to access a restricted function, the terminal comprising: an operating system including a group of user accounts identifying users having privileges for accessing a restricted function; and supervisor software for providing settlement, maintenance and diagnostic functions to a user of the terminal and arranged to: (i) detect attempted access by the service user to a restricted function on the self-service terminal, (ii) request login credentials from the service user, (iii) relay the login credentials to the operating system, and (iv) provide the service user with access to the restricted function if the operating system authenticates the login credentials, or deny the service user access to the restricted function if the operating system does not authenticate the login credentials.

The supervisor software may be arranged to detect attempted access by the user to a TCP/IP configuration menu option, a dialup configuration menu option, a set password menu option, or an encryption key entry or modification menu option.

The terminal may further comprise a mode switch, and the supervisor software may be executed in response to a change of state of the mode switch.

The operating system may be a Windows (trade mark) operating system. The Windows operating system may implement a User Group comprising a plurality of user accounts. The User Group may be granted batch job privilege only (not interactive login privilege) to prevent a user rebooting the terminal and logging in using one of the user accounts in the User Group (since batch job privilege only is cascaded to all user accounts within that User Group). The Windows User Group may be created using the Microsoft (trade mark) Management Console.

The terminal may include a maintenance display (which may be separate from a customer display). The maintenance display may present a screen inviting the user to enter a username and password as the request for login credentials from the user. Alternatively, the user may insert or present a card or other token to indicate a claimed identity, and may enter a password to verify the claimed identity.

Where the terminal does not include a full keyboard, a numeric keyboard may be provided that allows a user to enter text in a similar way to a telephone keypad, that is, using multiple presses of the same key to select different letters.

The self-service terminal may comprise an automated teller machine, an information kiosk, a financial services center, a bill payment kiosk, a lottery kiosk, a postal services machine, a check-in and/or check-out terminal such as those used in the retail, hotel, car rental, gaming, healthcare, and airline industries, or the like.

According to a third aspect there is provided supervisor software for use with a self-service terminal to provide secure authentication of a user attempting to access a restricted function, the supervisor software being arranged to: (i) detect attempted access by the user to a restricted function on the self-service terminal, (ii) request login credentials from the user, (iii) relay the login credentials to an operating system, and (iv) provide the user with access to the restricted function if the operating system authenticates the login credentials, or deny the user access to the restricted function if the operating system does not authenticate the login credentials.

The supervisor software may be embodied in computer memory within the terminal.

According to a fourth aspect there is provided a computer readable medium tangibly embodying one or more programs of instructions executable by a computer, to perform all of the method steps of the first aspect.

According to a fifth aspect there is provided a method of providing secure authentication of a service user at a self-service terminal, the method comprising: ascertaining if a predefined operating system account is present on the terminal; detecting attempted access by the service user to a restricted function on the self-service terminal; in the event that a predefined operating system account is not present, permitting access to the restricted function by the service user; in the event that a predefined operating system account is present, requesting the service user to provide login credentials; authenticating the login credentials using the operating system account; in the event that the login credentials are not authenticated, denying access to the restricted function; and in the event that the login credentials are authenticated, providing access to the restricted function.

For clarity and simplicity of description, not all combinations of elements provided in the aspects of the invention recited above have been set forth expressly. Notwithstanding this, the skilled person will directly and unambiguously recognize that unless it is not technically possible, or it is explicitly stated to the contrary, the consistory clauses referring to one aspect of the invention are intended to apply mutatis mutandis as optional features of every other aspect of the invention to which those consistory clauses could possibly relate.

These and other aspects will be apparent from the following specific description, given by way of example, with reference to the accompanying drawings.

DETAILED DESCRIPTION

Figure 1:
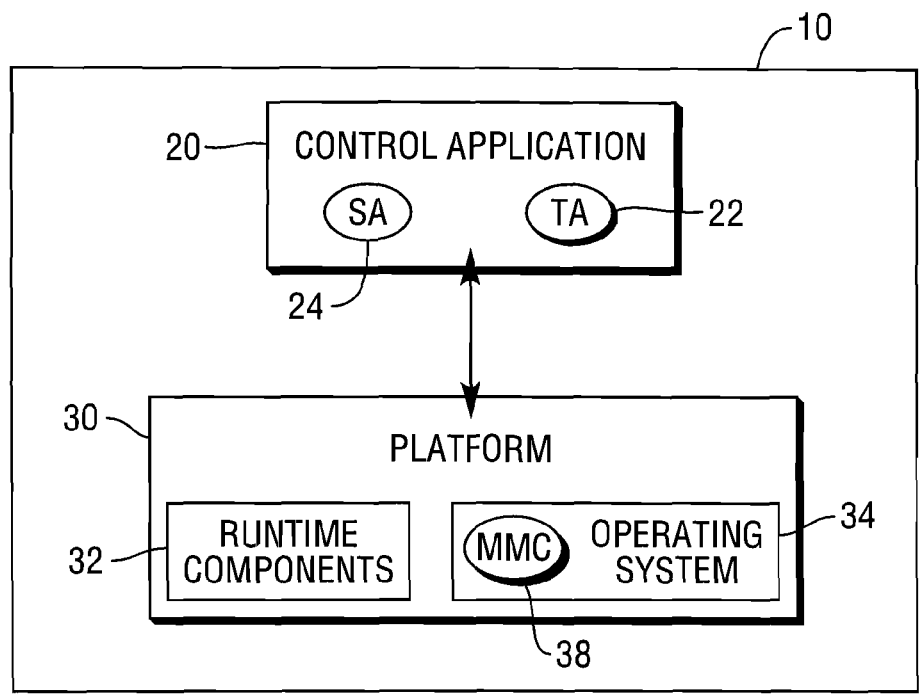
FIG. 1 is a simplified schematic diagram of an SST memory executing software components according to an embodiment of the present invention.

Reference will now be made to FIG. 1, which is a simplified, schematic diagram showing an SST memory 10 executing software components according to one embodiment of the present invention. In this embodiment the SST is an ATM, and the software components comprise: a control application 20 and a runtime platform 30.

The Control Application

The control application 20 comprises a Transaction Application 22 and a Supervisor Application 24).

As is known in the art, the Transaction Application 22 presents a sequence of screens on an ATM display to a customer at the ATM, collates information from the customer (for example, customer account information from a customer's ATM card, transaction request, transaction amount, and the like), obtains authorization for a transaction request from a remote authorization host (not shown), and instructs modules within the ATM, as needed, to fulfill an authorized transaction.

The Supervisor Application 24 provides settlement, diagnostic and maintenance functions for service users of the ATM. The Supervisor Application (SA) 24 is accessed by a service user selecting supervisor mode on the ATM. When this occurs, the Transaction Application 22 goes offline (after concluding any transaction currently in progress) and passes control of the modules to the SA 24.

The Runtime Platform

The runtime platform 30 comprises vendor independent run-time components (illustrated by the box 32) and an operating system kernel (illustrated by box 34).

In this embodiment, the operating system is a Windows XP (trade mark) operating system, available from Microsoft Corporation (trade mark). As is well known in the art, the operating system kernel 34 is responsible for memory, process, task, and disk management, and includes routines for implementing these functions. The operating system also includes a Microsoft Management Console (MMC) 38 for, inter alia, creating and managing Windows Groups and Windows User Accounts.

In this embodiment, the vendor independent run-time components 32 are a set of APTRA (trade mark) XFS components, available from NCR Corporation, 1700 S. Patterson Blvd., Dayton, Ohio 45479, U.S.A. The run-time components 32 provide a range of programming facilities specific to self-service terminal devices and services.

One function of the run-time components 32 is to enhance the operating system 34 so that the operating system 34 and run-time components 32 together provide high level access to all of the devices and modules, including both standard home computing devices (via the operating system 34), and XFS computing devices (via the run-time components 32). Thus, the combination of the run-time components 32 and the operating system 34 can be viewed as providing a complete ATM operating system. XFS is the eXtensions for Financial Services client-server architecture for financial applications running on a Microsoft Windows (trade mark) platform.

ATM Architecture

Figure 2:
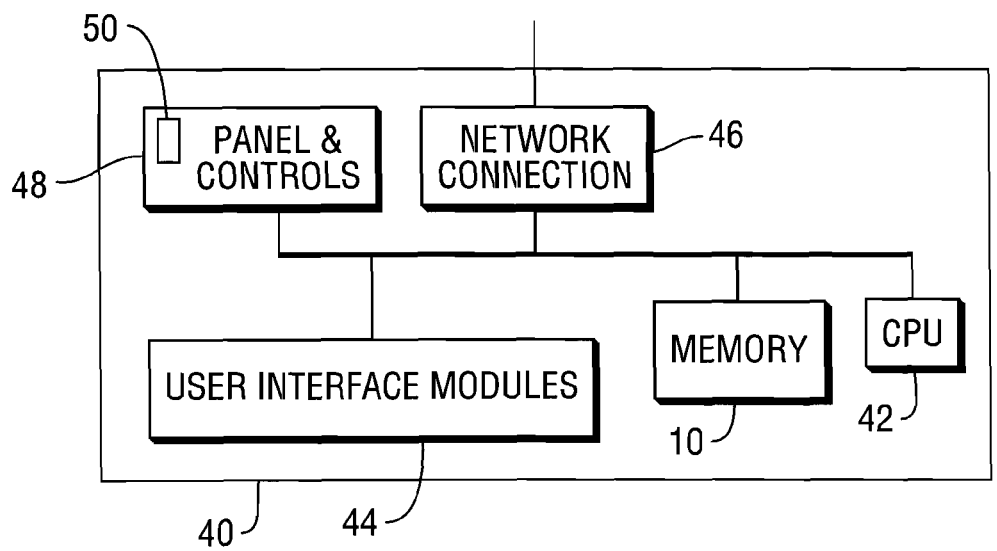
FIG. 2 is a simplified schematic diagram of an SST including the memory executing the software components of FIG. 1.

Reference will now also be made to FIG. 2, which is a simplified schematic diagram of an ATM 40 including the memory 10 executing the software components of FIG. 1.

The ATM 40 comprises a central processing unit (CPU) 42 coupled to the memory 10, a plurality of user interface modules 44 (not shown in detail, but including a cash dispenser, a card reader, a customer display, a receipt printer, an encrypting keypad, and the like), a network connection module 46, and a service operator panel 48.

The service operator panel 48 enables information to be retrieved from, and diagnostic tests to be performed on, the modules 44,46 within the ATM 40. The service operator panel 48 also enables a service user to configure the Control Application 20.

The service panel 48 includes a numeric keypad (not shown), a reset switch (not shown) for resetting the ATM 40, and a physical mode switch 50 for switching the ATM 40 between transaction mode and supervisor mode.

In supervisor mode, a service user (typically a second line maintenance person) can launch a vendor dependent application (not shown) to enter vendor dependent mode (VDM) and execute diagnostic tasks. When the service user has completed this, then he/she can exit the vendor dependent application and press the mode switch 50 to return control of the modules 44,46 to the control application 20. This is referred to as returning to transaction mode. Supervisor mode is also used by service users who do not access VDM, but who use the SA 24 to obtain settlement data and/or to configure the control application 20.

The network connection module 46 enables the ATM 40 to communicate with a remote authorization host (not shown) for authorizing transactions requested by an ATM customer.

Operation of ATM in Supervisor Mode

The operation of the ATM 40 in supervisor mode will now be described with reference to FIG. 3, which is a flowchart illustrating steps involved when a service user attempts to access a restricted function of the ATM 40, and also with reference to FIG. 4, which is a pictorial diagram of a menu screen presented on the service operator panel 48.

Initially, the control application 20 detects that the service user has pressed the mode switch 50 to enter supervisor mode (step 100).

The control application 20 then completes any transaction currently being implemented (step 102) and then transfers control of the ATM 40 to the SA 24 (step 104).

The SA 24 presents a screen 60 (FIG. 4) including graphical menu options on the service panel 48 (step 106) for the service user to view. These menu options relate to functions that can be performed by the SA 24.

The SA 24 ascertains if a specific, named User Group has been created by the operating system 34 (step 108). In Windows-based operating systems, named User Groups can be created using the Microsoft Management Console 38. When this named User Group is created (or subsequent to creation of this User Group), it is populated with individual user accounts listing usernames and passwords for service users who are authorized to access restricted functions. The User Group containing the user accounts is granted batch job privilege only (which cascades to all of the user accounts within that User Group) to prevent a service user from rebooting the ATM 40 and logging in using those account details. The User Group defines what restricted functions can be accessed.

In this embodiment, the named Group is "ANDCSupervisorUsers". The SA 24 ascertains if this is present by sending a request to the operating system to list the names of all User Groups stored therein.

If the named Group ("ANDCSupervisorUsers") is not present, then no secure supervisor authentication is required, and the SA 24 grants the service user full access to all functions that can be implemented through the menu options (step 110) on menu screen 60. The process then continues in a conventional manner by the service user completing the desired settlement, maintenance or diagnostic tasks (step 112). It should be appreciated that further access provisions may be implemented (for example, using login credentials stored in the SA 24) to ensure that, for example, only currency replenishers can access currency replenishment functions, only second level maintenance engineers can access some diagnostic functions, and the like. These further access provisions are independent of the restricted access described herein.

Once the user has performed these tasks using the SA 24, he/she presses the mode switch 50 to return the ATM 40 to transaction mode in the same manner as for a conventional ATM.

If the named Group ("ANDCSupervisorUsers") is present (that is, it is a defined User Group within the operating system 34), then the SA 24 implements a restricted function policy (step 120), as will now be described.

The restricted function policy is a mechanism by which the SA 24 ascertains if a selected menu option corresponds to a function that has been defined as posing a potential security risk. If this is the case, then the restricted function policy requires secure authentication of the person attempting to access that menu option.

Each time the user selects an option from the menu screen 60, the SA 24 ascertains if this selected option corresponds to a restricted function (step 122). In this embodiment, selectable options have an associated number (as shown in FIGS. 4 to 7) so that the option can be selected by pressing the corresponding number on the numeric keypad (not shown) on the service operator panel 48 and then pressing "Enter" on the numeric keypad (not shown).

Restricted functions are defined by the SA 24 prior to runtime, so the SA 24 compares the selected menu option with a list of those menu options that correspond to a restricted function to ascertain if there is a match. It is possible that all menu options are restricted, but it may be more efficient if only some menu options are restricted, and others unrestricted.

Figure 4:
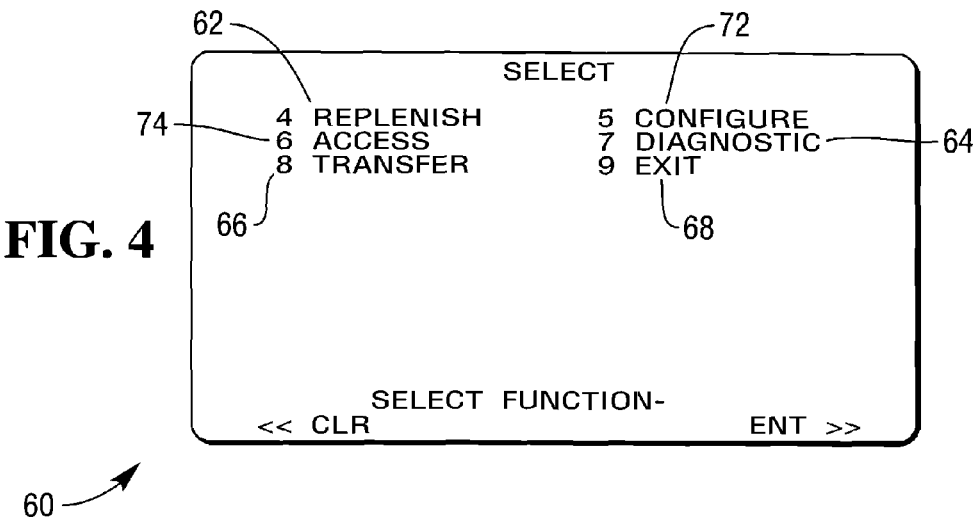
FIG. 4 is a pictorial diagram of a menu screen presented by the SST of FIG. 2 to a service user.

Referring specifically to FIG. 4, examples of unrestricted functions may include a replenish menu option 62, a diagnostic menu option 64, a transfer menu option 66, and an exit option 68. The replenishment menu option 62 contains options for maintaining the ATM supplies (for example, printer paper and banknotes) and the counters relating to those ATM supplies. The diagnostic menu option 64 provides access to functions that are used to perform configuration and maintenance on the ATM 40. The transfer menu option 66 allows a service user to switch control of the SA 24 from the service control panel 48 to a customer display (one of the user interface modules 44) and vice versa. The exit menu option 68 allows a service user or replenisher to exit the SA 24.

Although these functions are referred to as "unrestricted", this is only in the sense that they are not subject to the restricted function policy described herein. To access cash replenishment functions (whether the restricted function policy is implemented or not) may require a service user (a replenisher) to provide replenishment login credentials and/or a secure token (such as an integrated circuit card). This embodiment does not affect this requirement in any way.

Examples of restricted functions (that is, restricted in accordance with the restricted function policy described herein) may include: a configuration menu option 72 and an access menu option 74. Current ATMs typically implement password protection for these menu options 72,74, but this is not secure authentication because the password is stored in plain text, which is not PA-DSS compliant.

The configuration menu option 72 allows a service user to set local configuration parameters for the ATM 40. The access menu option 74 allows a service user to set or change passwords, to enter encryption keys, to specify which menu is to appear when supervisor mode is entered, and the like.

Figure 5:
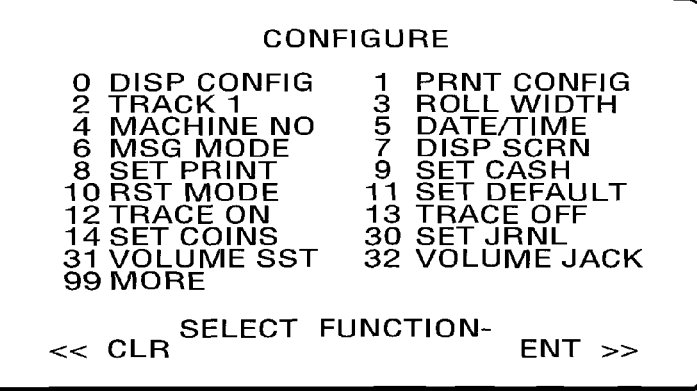
FIG. 5 is a pictorial diagram of two second-level screens presented by the SST of FIG. 2 to a service user illustrating some restricted functions and some unrestricted functions.
Figure 5:
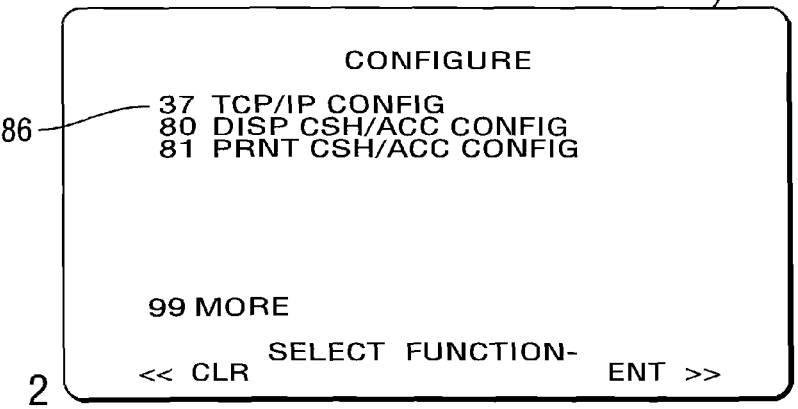
Figure 6:
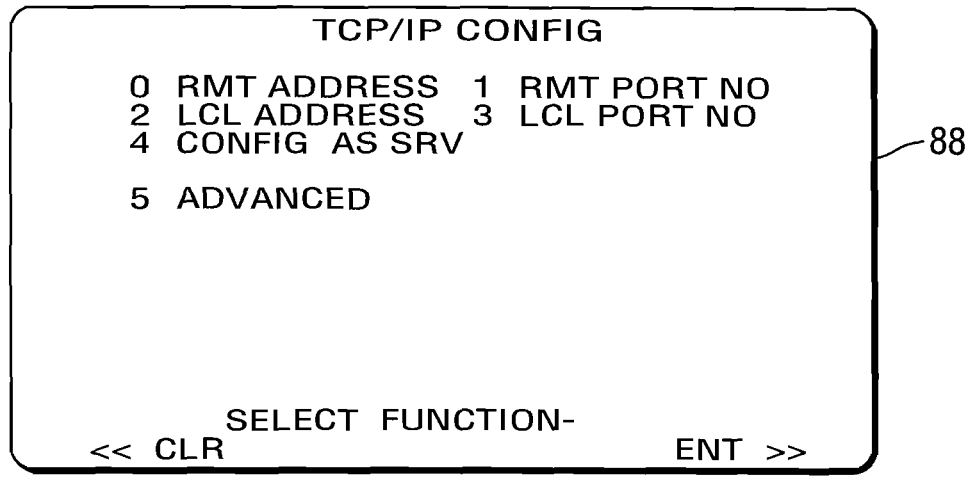
FIG. 6 is a pictorial diagram of a third-level screen presented by the SST of FIG. 2 to a service user illustrating some restricted functions.
Figure 7:
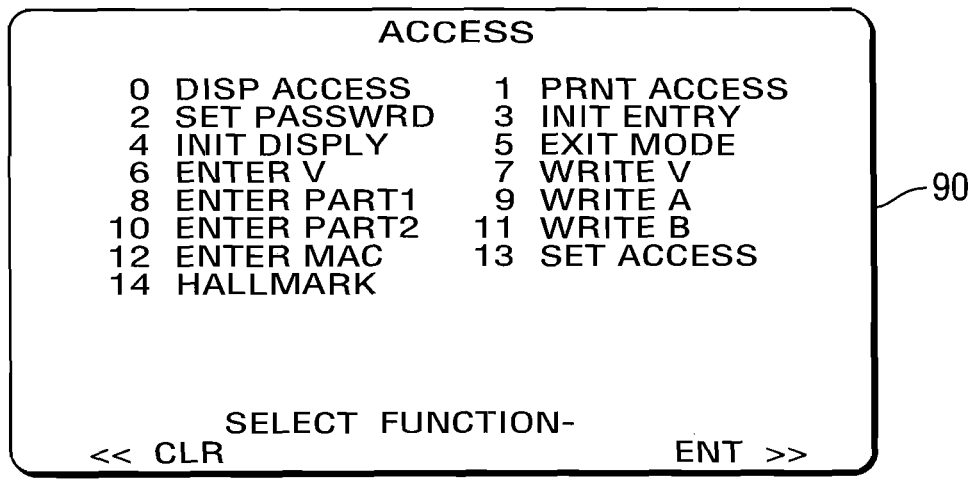
FIG. 7 is a pictorial diagram of another second-level screen presented by the SST of FIG. 2 to a service user illustrating some restricted functions and some unrestricted functions.

In this embodiment, the entire configuration menu option 72 is not restricted, only some of the sub-options are restricted, as illustrated in FIG. 5, which is a pictorial view of two second-level configuration option screens 82,84. Two screens 82,84 are required in this embodiment because there are too many sub-options to fit on one screen. The only restricted menu option in FIG. 5 is the TCP/IP configuration menu option 86. This allows the service user to configure, inter alia, the remote and local IP addresses and ports, as illustrated in FIG. 6. Thus, for example, a user can display the current ATM configuration ("DISP CONFIG") or print the current ATM configuration ("PRNT CONFIG") without having to access a restricted function.

In this embodiment, the entire access menu option 74 is not restricted, only some sub-options are restricted. This stops a service user from entering new encryption keys ("ENTER V", "WRITE V", "WRITE A", "WRITE B", "ENTER MAC"), and other secure functions without being securely authenticated by the restricted function policy. However, the service user can set exit modes, initialize the display, and the like without requiring to be securely authenticated.

Figure 3:
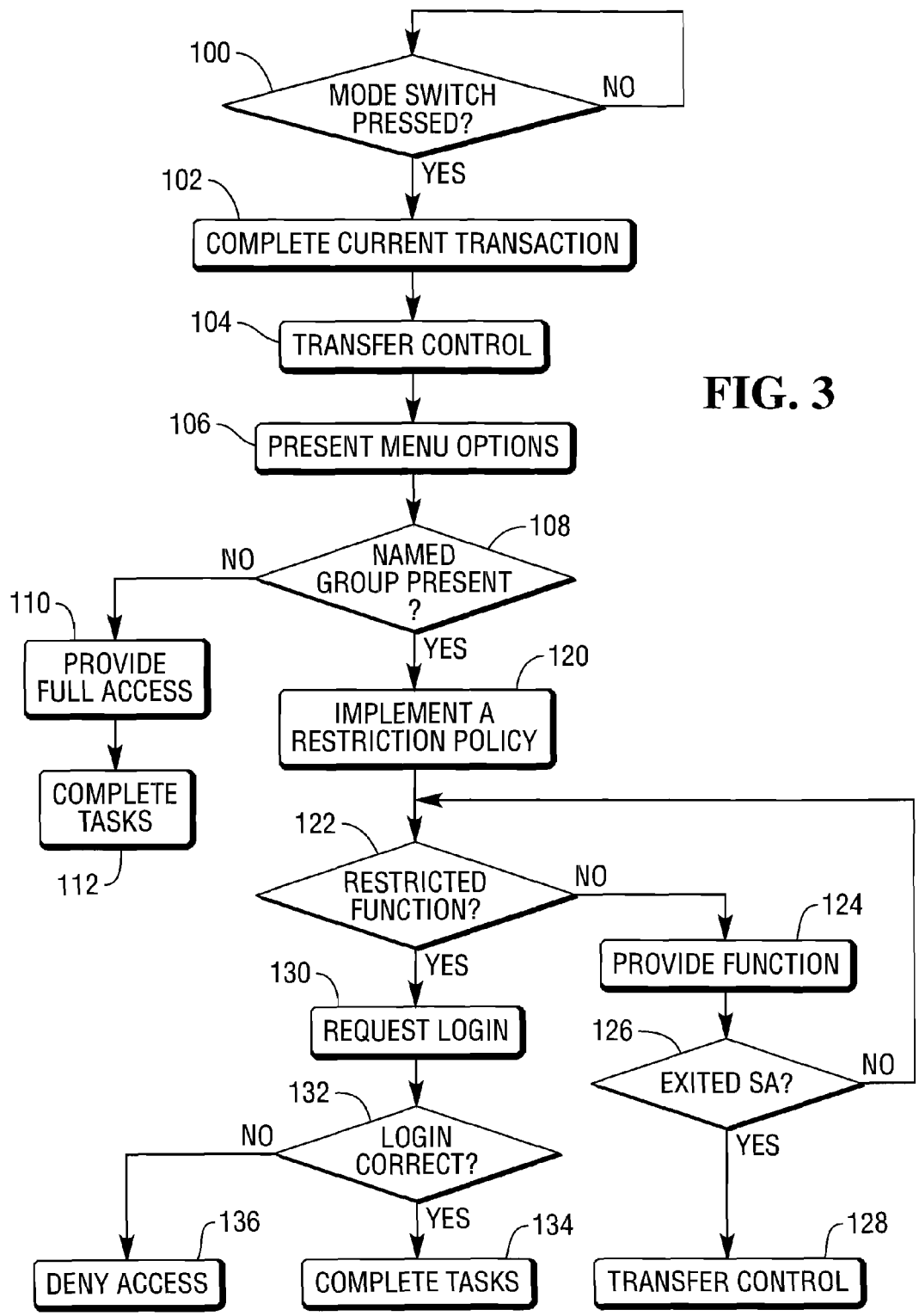
FIG. 3 is a flowchart illustrating steps involved when a service user attempts to access a restricted function of the SST of FIG. 2.

Returning now to the flowchart of FIG. 3, if the SA 24 ascertains that a menu option selected by the service user does not access a restricted function, then the SA 24 will implement this selected function (step 124) either directly or by presenting additional menus with further options.

Once this has been completed, the SA 24 detects if the service user selects the exit option 68 (step 126) and presses the mode switch 50. If the service user does this (exits the SA 24), then the SA 24 will stop and transfer control of the ATM 40 to the control application 20 (step 128). If the service user does not do this (exits the SA 24), then the SA 24 will return to step 122.

If the SA 24 ascertains that a menu option selected by the service user does access a restricted function, then the SA 24 will require the service user to provide login credentials (in the form of a username and password) via a login screen (not shown) (step 130).

The service user enters this data via the numeric keypad (not shown) in the service operator panel 48 by pressing a numeral multiple times to select the desired letter (in the same way as entering a text message at a cellular telephone). For example, the service user may press numeral "2" once to get the number "2", twice to get "A", three times to get "B", and four times to get "C".

The SA 24 will then validate the entered login credentials (step 132). This is implemented as follows. When the SA 24 receives the login credentials, it passes them to the operating system 34 (using an operating system API call) to validate. The operating system 34 will validate the username/password combination if that username/password exists within the operating system 34 (not just as a user account stored in the "ANDCSupervisorUsers" Windows User Group). If the username/password combination is validated by the operating system 34, then the SA 24 requests the operating system 34 to provide a list of user accounts stored in the "ANDCSupervisorUsers" Windows User Group. The SA 24 then compares the received username (from the login credentials) with the usernames listed in the user accounts stored in the "ANDCSupervisorUsers" Windows User Group. If the username corresponds to a listed username within the "ANDCSupervisorUsers" Windows User Group then the SA 24 allows the service user access to the restricted functions (step 134) and completes the desired tasks. The operating system 34 automatically logs details of when the service user was authenticated, thereby providing an audit trail for all authenticated accesses to restricted functions.

If the SA 24 cannot authenticate the login credentials, for example because the username provided by the service user is not stored within the operating system, or the password is incorrect for that username, or because the username is not listed as a user account in the "ANDCSupervisorUsers" Windows User Group, or the service user does not have sufficient access rights, then the SA 24 denies access to the service user (step 136) and presents the service user with a screen (not shown) explaining why access was denied, for example, "Invalid username", Incorrect Password", "User Does Not Have Necessary Permission to Access this Menu Option", or the like.

The SA 24 may allow the service user multiple attempts to login, but to meet PA-DSS requirements, there must be no more than six login attempts allowed before the account becomes disabled. The number of attempts permitted by the SA 24 can be set as a Group Policy using the MMC 38.

If an account is disabled, it remains disabled for a predetermined length of time, as set by Group Policy.

It will now be appreciated that by creating a User Group having a specified name, access rights can be created, defined, managed, and authenticated through the operating system's group policy and local user accounts. This allows secure password storage to be handled by the underlying operating system.

Various modifications may be made to the above described embodiment within the scope of the invention, for example, in other embodiments, a self-service terminal other than an ATM may be used.

In other embodiments, the User Group may have a different name than that used above (that is, different from "ANDC-SupervisorUsers").

In other embodiments, instead of providing a physical mode switch 50, the ATM may detect a request to change modes by, for example, sensing a door being opened, a predefined key on the service operator panel 48 being pressed, or an icon on a supervisor display being selected.

In other embodiments, the SST may be able to execute customer transactions even when a service user is operating on the SST.

In other embodiments, different restricted functions may be configured than those described above, for example, for SSTs that use a dialup connection, rather than a permanent connection, a dialup configuration menu option may be restricted.

In other embodiments, the entire access menu option may not be restricted, only some sub-options of the access menu may be restricted.

In other embodiments, a different type of operating system may be used than that described, for example, a different Microsoft (trade mark) operating system, or a non-Microsoft operating system, such as Linux or Unix.

In the above embodiment, the vendor independent run-time components 32 are a set of APTRA (trade mark) XFS components; in other embodiments, run-time components from a different SST vendor may be used.

In other embodiments, the Supervisor Application 24 may be separate from the Control Application 20.

In other embodiments, the service operator panel 48 may comprise a touch-sensitive panel overlying a display; or the customer display may be used as the service operator panel 48.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

What is claimed is:

1. A method of providing secure authentication of a service user at a self-service terminal, the method comprising:

detecting attempted access by the service user to a restricted function on the self-service terminal;

ascertaining if a predefined operating system account is present on the self-service terminal;

in the event that the predefined operating system account is not present on said terminal, permitting access to the restricted function by the service user;

in the event that the predefined operating system account is present on said terminal, requesting the service user to provide login credentials and relaying the login credentials to an operating system;

authenticating the login credentials using the operating system account;

in the event that the login credentials are not authenticated by the operating system, denying access to the restricted function; and in the event that the login credentials are authenticated by the operating system, providing access to the restricted function and storing details of when the login credentials were authenticated.

2. A method according to claim 1, wherein the step of detecting attempted access by the service user to a restricted function on the self-service terminal further comprises detecting attempted access to a configuration menu option.

3. A method according to claim 1, wherein the step of ascertaining if a predefined operating system account is present on the terminal comprises detecting if a named operating system group of user accounts has been defined by the operating system.

4. A method according to claim 1, wherein the step of requesting the service user to provide login credentials comprises requesting the service user to enter a username and password combination.

5. A method according to claim 4, wherein the step of authenticating the login credentials using the operating system account comprises ascertaining if the entered username is listed in a named operating system group of user accounts, and if the username is listed, ascertaining if the entered password matches the stored password for that operating system account.

6. A method according to claim 1, wherein the method comprises the further step of ensuring that the operating system account for a service user does not permit the service user to login to the terminal as the terminal is booting up.

7. A method according to claim 1, wherein the step of detecting attempted access by the service user to a restricted function on the self-service terminal is performed prior to the step of ascertaining if a predefined operating system account is present on the terminal.

8. A method according to claim 1, wherein the step of detecting attempted access by the service user to a restricted function on the self-service terminal is performed simultaneously with, or subsequent to, the step of ascertaining if a predefined operating system account is present on the terminal.

9. A non-transitory computer readable medium tangibly embodying one or more programs of instructions executable by a computer, to perform all of the steps of claim 1.

10. A method according to claim 1, wherein (i) the self-service terminal does not comply with Payment Application Data Security Standard (PA-DSS) guidelines in the event that the predefined operating system account is not present on the terminal, and (ii) the self-service terminal complies with PA-DSS guidelines in the event that the predefined operating system account is present on the terminal.

11. A method according to claim 10, wherein the method comprises the further step of disabling the predefined operating system account for at least a predetermined length of time in accordance with PA-DSS guidelines if the service user attempts more than six times to provide login credentials.

12. A self-service terminal providing secure authentication of a service user attempting to access a restricted function, the terminal comprising:
   an operating system including a group of user accounts identifying users having privileges for accessing a restricted function; and
   supervisor software for providing settlement, maintenance and diagnostic functions to a user of the terminal and arranged to:
   (i) detect attempted access by the service user to a restricted function on the self-service terminal,
   (ii) determine if a predefined operating system account is present on the self-service terminal,
   (iii) permit access to the restricted function by the service user if the predefined operating system account is determined to be absent on the self-service terminal,
   (iv) request login credentials from the service user if the predefined operating system account is determined to be present on the self-service terminal,
   (v) relay the login credentials to the operating system if login credentials is requested from the service user, and
   (vi) provide the service user with access to the restricted function if the operating system authenticates the login credentials using the operating system account, or deny the service user access to the restricted function if the operating system does not authenticate the login credentials.

13. A self-service terminal according to claim 12, wherein the supervisor software is arranged to detect attempted access by the service user to a TCP/IP configuration menu option.

14. A self-service terminal according to claim 12, wherein the terminal further comprises a mode switch, and the supervisor software is executed in response to a change of state of the mode switch.

15. A self-service terminal according to claim 12, wherein the operating system implements a user group comprising a plurality of user accounts.

16. A self-service terminal according to claim 12, wherein the terminal includes a maintenance display separate from a customer display, and the maintenance display presents a screen inviting the service user to enter a username and password as the request for login credentials from the service user.

17. A self-service terminal according to claim 12, wherein the supervisor software is further arranged to disable the predefined operating system account for at least a predetermined length of time in accordance with Payment Application Data Security Standard (PA-DSS) guidelines when the service user attempts more than six times to provide login credentials.

18. A non-transitory program storage medium readable by a computer having a memory, the medium tangibly embodying one or more programs of instructions executable by the computer to perform method steps for use with a self-service terminal to provide secure authentication of a service user attempting to access a restricted function, the method comprising the steps of:
   (i) detecting attempted access by the service user to a restricted function on the self-service terminal,
   (ii) determining if a predefined operating system account is present on the self-service terminal,
   (iii) permitting access to the restricted function by the service user if the predefined operating system account is determined to be absent on the self-service terminal,
   (iv) requesting login credentials from the service user if the predefined operating system account is determined to be present on the self-service terminal,
   (v) relaying the login credentials to an operating system if login credentials is requested from the service user, and
   (vi) providing the service user with access to the restricted function if the operating system authenticates the login credentials using the operating system account, or denying the service user access to the restricted function if the operating system does not authenticate the login credentials.

19. A non-transitory computer readable medium according to claim 18, wherein (i) the method does not comply with Payment Application Data Security Standard (PA-DSS) guidelines if the predefined operating system account is determined to be absent on the self-service terminal, and (ii) the method complies with PA-DSS guidelines if the predefined operating system account is determined to be present on the self-service terminal.

20. A non-transitory computer readable medium according to claim 19, wherein the method comprises the further step of disabling the predefined operating system account for at least a predetermined length of time in accordance with PA-DSS guidelines if the service user attempts more than six times to provide login credentials.

* * * * *